(12) United States Patent
Gillet

(10) Patent No.: US 10,857,718 B2
(45) Date of Patent: Dec. 8, 2020

(54) PISTON DEVICE COMPRISING A VALVE CONTROLLING THE INLET OF THE PISTON DEVICE

(71) Applicant: DISCMA AG, Hunenberg (CH)

(72) Inventor: Denis Gillet, Octeville sur Mer (FR)

(73) Assignee: Discma AG, Zürich (CH)

( * ) Notice: Subject to any disclaimer, the term of this patent is extended or adjusted under 35 U.S.C. 154(b) by 619 days.

(21) Appl. No.: 15/104,137

(22) PCT Filed: Dec. 10, 2014

(86) PCT No.: PCT/EP2014/077284
§ 371 (c)(1),
(2) Date: Jun. 13, 2016

(87) PCT Pub. No.: WO2015/086707
PCT Pub. Date: Jun. 18, 2015

(65) Prior Publication Data
US 2016/0354966 A1 Dec. 8, 2016

(30) Foreign Application Priority Data
Dec. 13, 2013 (EP) .................................. 13306720

(51) Int. Cl.
*B29C 49/42* (2006.01)
*B65B 3/02* (2006.01)
*B29C 49/46* (2006.01)
*B29C 49/58* (2006.01)
(Continued)

(52) U.S. Cl.
CPC .......... *B29C 49/4289* (2013.01); *B29C 49/46* (2013.01); *B29C 49/58* (2013.01); *B65B 3/022* (2013.01); *B29C 49/06* (2013.01); *B29C 2049/4664* (2013.01); *B29C 2049/5803* (2013.01); *B29L 2031/712* (2013.01)

(58) Field of Classification Search
CPC ..... B29C 49/06; B29C 49/4289; B29C 49/46; B29C 49/58; B29C 2049/4294; B29C 2049/4664; B29C 2049/5803; B65B 3/022; B29L 2031/712; F04B 49/225; F04B 49/22; F04B 7/00; F04B 7/0266; F04B 7/04; F04B 7/045
USPC ............ 264/523; 425/524; 137/495; 417/53, 417/289
See application file for complete search history.

(56) References Cited

U.S. PATENT DOCUMENTS

| 6,079,636 A * | 6/2000 | Rembold | F02M 51/04 239/102.2 |
| 2004/0202047 A1* | 10/2004 | Fripp | B06B 1/06 367/81 |

(Continued)

*Primary Examiner* — Robert C Dye
*Assistant Examiner* — Sedef E Paquette
(74) *Attorney, Agent, or Firm* — Eric J. Sosenko; Jonathan P. O'Brien; Honigman LLP

(57) ABSTRACT

A piston device having an inlet through which the piston device can receive liquid and an outlet through which the piston device can inject pressurize liquid. A main body (28) of the piston device defines an inner chamber and an upstream duct placing the inner chamber in fluidic communication with the inlet. A valve having a valve plate, which is movable along a plate actuation path, between at least an opened position of the plate and a closed position of the plate.

The plate actuation path extending at least in part inside the upstream duct.

13 Claims, 8 Drawing Sheets

(51) Int. Cl.
*B29C 49/06* (2006.01)
*B29L 31/00* (2006.01)

(56) References Cited

U.S. PATENT DOCUMENTS

| | | | |
|---|---|---|---|
| 2008/0029928 A1* | 2/2008 | Andison | B29C 49/46 264/238 |
| 2011/0268855 A1 | 3/2011 | Chauvin et al. | |
| 2012/0315348 A1 | 12/2012 | Wilson et al. | |
| 2014/0356475 A1 | 4/2014 | Sato et al. | |
| 2014/0134003 A1* | 5/2014 | Bez | F04B 17/00 417/53 |
| 2014/0157723 A1 | 6/2014 | Feuilloley | |
| 2015/0076746 A1* | 3/2015 | Handschuh | F16K 31/163 264/523 |

\* cited by examiner

PISTON DEVICE COMPRISING A VALVE CONTROLLING THE INLET OF THE PISTON DEVICE

CROSS-REFERENCE TO RELATED APPLICATIONS

This application is the U.S. National phase of PCT application no. PCT/EP2014/077284 filed on Dec. 10, 2014, which claims priority to EP13306720.7 filed on Dec. 13, 2013, the disclosures of which are incorporated in their entirety by reference herein.

TECHNICAL FIELD OF THE INVENTION

The present invention relates to a piston device for a forming and filling station for forming a preform into a container and filling said container using a pressurized liquid.

The invention also relates to a forming and filling station comprising such a piston device and to a method for forming a preform into a container and filling said container using such a station.

The invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like edible oil or soup), or a high viscosity (like yoghurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

The piston device is used to inject the liquid at a predetermined pressure profile adapted to urge the preform against the wall of a mold cavity having the shape of the container to be produced.

The piston device is connected to a liquid source, on one hand, and to an injection device, such as an injection nozzle, on the other hand. The piston device is arranged to draw in liquid from the liquid source and to inject it at a predetermined pressure in the injection device. Consequently, a closable fluidic communication between the piston device and the liquid source has to be provided in order to allow liquid to flow from the liquid source to the piston device to fill a chamber of the piston device by opening the fluidic communication and to prevent the liquid from returning to the liquid source when the chamber is emptied by closing the fluidic communication.

The closing of the fluidic communication between the liquid source and the piston device is conventionally controlled by a valve device placed in a duct extending between the liquid source and the piston device and actuated to open or close the fluidic communication. FR-2 978 371 for example discloses such a valve device.

However, such an arrangement is particularly cumbersome and has a poor response time because the valve device is placed too far away from the piston device, creating a large volume of liquid between the closed valve device and the piston device. It increases the space requirement of the station comprising the piston device.

EP-2 694 271 discloses a piston device having:
an inlet through which said device can receive liquid;
an outlet through which said device can inject said pressurize liquid;
a main body defining an inner chamber and an upstream duct placing the inner chamber in fluidic communication with the inlet;
an injection piston movable inside the inner chamber separating the inner chamber in an active portion and in a complementary portion, said injection piston isolating the active portion from the complementary portion, said active portion being in fluidic communication with both the upstream duct and the outlet,
a valve extending at the inlet and actuable between an opened position, wherein liquid is allowed to flow in the active portion of the inner chamber, and a closed position, wherein liquid communication between the inlet and the active portion of the chamber is prevented.

This document does not disclose the nature of the valve used in the piston device. However, this valve is also placed far away from the inner chamber, resulting in a poor response time.

One of the aims of the invention is to overcome at least one of the above drawbacks by proposing a compact piston device having a satisfactory response time for closing the fluidic communication with the liquid source.

SUMMARY OF THE INVENTION

To this end, the invention relates to a piston device comprising:
an inlet through which said device can receive liquid;
an outlet through which said device can inject said pressurize liquid;
a main body defining an inner chamber and an upstream duct placing the inner chamber in fluidic communication with the inlet;
an injection piston movable inside the inner chamber separating the inner chamber in an active portion and in a complementary portion, said injection piston isolating the active portion from the complementary portion, said active portion being in fluidic communication with both the upstream duct and the outlet,
a valve comprising a valve plate movable along a plate actuation path, comprising at least an opened position of the plate, wherein liquid is allowed to flow inside the active portion of the inner chamber from the inlet, and a closed position of the plate, wherein liquid is prevented from flowing from said active portion into the inlet,
wherein the plate actuation path extends at least in part inside the upstream duct.

By making the valve part of the piston device and by providing a plate actuation path extending at least in part inside the upstream duct, the valve is placed near the piston, which reduces the space requirement of the station comprising the piston device and improves the response time for placing the valve plate in the closed position using the pressure of the liquid inside the inner chamber.

As mentioned previously, EP-2 694 271 does not disclose the nature of the valve and hence that the valve comprises a valve plate moving along a plate actuation path extending at least in part inside the upstream duct, i.e. between the inlet and the inner chamber of the piston device. The fact that the plate actuation path extends at least in part inside the upstream duct is essential to the invention because this feature guaranties that the valve is placed near the piston.

According to another feature of the piston device according to the invention, the inner chamber and the upstream duct are located inside the main body and the main body forms a single rigid block or is made of rigid elementary bodies rigidly fixed together.

The piston device therefore includes both the piston and the valve arrangement, which makes the piston device a very compact single unit.

According to another feature of the piston device according to the invention, the valve plate is applied in a fluid tight manner against a valve seat in the closed position of the plate, said valve seat having a central bore forming the inlet of the piston device, the valve plate extending between said valve seat and said inner chamber such that, when the active portion of the inner chamber is filled with liquid and the injection piston moves to reduce the volume of the active portion, a force applied by the liquid urges the valve plate against the valve seat.

The valve plate is moved in its closed position by the liquid in the inner chamber which is pressurized by the movement of the piston, thereby providing an important force maintaining the valve plate in its closed position and a satisfactory response time since the valve plate is placed near the piston.

According to other features of the piston device according to the invention:
the valve seat is formed by a wall of a seat body attached to the main body in a fluid tight manner;
the valve comprises actuation means for moving the valve plate between its closed position and opened position;
the actuation means comprise an actuation rod attached to the valve plate and movable in translation and an actuator attached to the actuation rod opposite the valve plate, said actuator being isolated in a fluid tight manner from the upstream duct, at least when the valve plate moves between the opened position and closed position of the valve plate; and
the actuator comprises an actuation piston placed in fluid tight contact with a wall of an actuation chamber, said actuation piston being movable inside said actuation chamber using an actuation fluid, the valve comprising sealing means for isolating the actuation chamber from the upstream duct, the actuation rod passing through said sealing means to connect the actuation piston to the valve plate.

According to a first embodiment of the piston device according to the invention, the actuation chamber is defined by the main body and the actuation rod extends downstream of the valve plate between said valve plate and the actuation piston.

By providing the actuation chamber in the main body, the piston device is made very compact and the space requirement for the station comprising the piston device is reduced.

According to a second embodiment of the piston device according to the invention, the actuation chamber is defined by the seat body and the actuation rod extends upstream of the valve plate between said valve plate and the actuation piston.

By providing the actuation chamber in the seat body, the valve can easily be separated from the main body, thereby easing its replacement or its reparation in case of defect of the valve.

According to another feature of the piston device according to the invention, the sealing means comprise at least a flexible membrane attached to an attachment wall of an actuation duct, separating the actuation chamber from the upstream duct, and to the actuation rod, said flexible membrane being deformable to allow the movement of the actuation rod relative to said actuation duct.

According to another feature of the piston device according to the invention, the valve plate is further movable in at least one cleaning position located passed the opened position with respect to the closed position, an actuation duct separating the actuation chamber and the upstream duct, and wherein the sealing means comprise a seal ring attached to one of the actuation duct and of the actuation rod, the other of the actuation duct and of the actuation rod having a sliding area along which the seal ring slides during the relative movement of the valve plate with respect to the main body, the sliding area including a communication groove located opposite of the seal ring when the valve plate is in the cleaning position, the communication groove being arranged to allow liquid to flow between the ring seal and the sliding area, thereby placing the actuation duct in fluidic communication with the upstream duct.

When the valve plate in moved in the cleaning position, it is possible to clean the various parts of the valve with the cleaning products of the piston device, simply by replacing the liquid from the liquid source by the cleaning products and by actuating the piston of the piston device. The cleaning of the piston device is therefore particularly simple and does not require cleaning the valve separately.

According to other features of the piston device according to the invention:
the actuation chamber comprises a cleaning area having a diameter greater than the diameter of the actuation piston, said actuation piston being placed in said cleaning area in the cleaning position of the valve plate such that liquid flowing in the actuation chamber is able to flow around the actuation piston; and
the actuation means comprise an additional piston placed in the cleaning area of the actuation chamber and being in fluid tight contact with the wall of said cleaning area, said additional piston being actuable to move the actuation piston from the cleaning area to an active area where the actuation piston is in liquid tight contact with the wall of the actuation chamber to place the valve plate back in the opened position.

According to another feature of the piston device according to the invention, the valve plate extends upright of the section of the inner chamber both in the opened position and in the closed position.

In other words, the projection of the valve plate in a plane substantially perpendicular to the axis of the inner chamber remains, in both positions, inside the contour defined by the projection of the inner chamber in said plane. The valve is consequently very close from the inner chamber, which allows having a very compact piston device and guaranties a quick response time.

The invention also relates to a forming and filling station for forming a preform into a container and filling said container using a pressurized liquid, said station comprising:
a liquid source,
an injection device, comprising an inlet and an outlet, said injection device being arranged to inject liquid from the liquid source into a preform through the outlet,
a piston device as defined above, the inlet of the piston device being in fluidic communication with the liquid source and the outlet of the piston device being in fluidic communication with the inlet of the injection device such that the piston device is able to inject liquid from the liquid source in the injection device at a predetermined pressure.

The invention also relates to a method for forming a preform into a container and filling said container with pressurized liquid using a forming and filling station as described above, said method comprising the following steps:

placing the injection device in fluidic communication with a preform;

placing the valve plate of the piston device in the opened position and moving the injection piston towards the full position such that liquid from the liquid source fills the active portion of the inner chamber of the piston device, placing the valve plate in the closed position and moving the injection piston towards the empty position in order to inject the liquid from the active portion of the inner chamber at a predetermined pressure in the injection device and in the preform in order to shape the preform into a container and fill said container with said liquid.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

Figure 1:
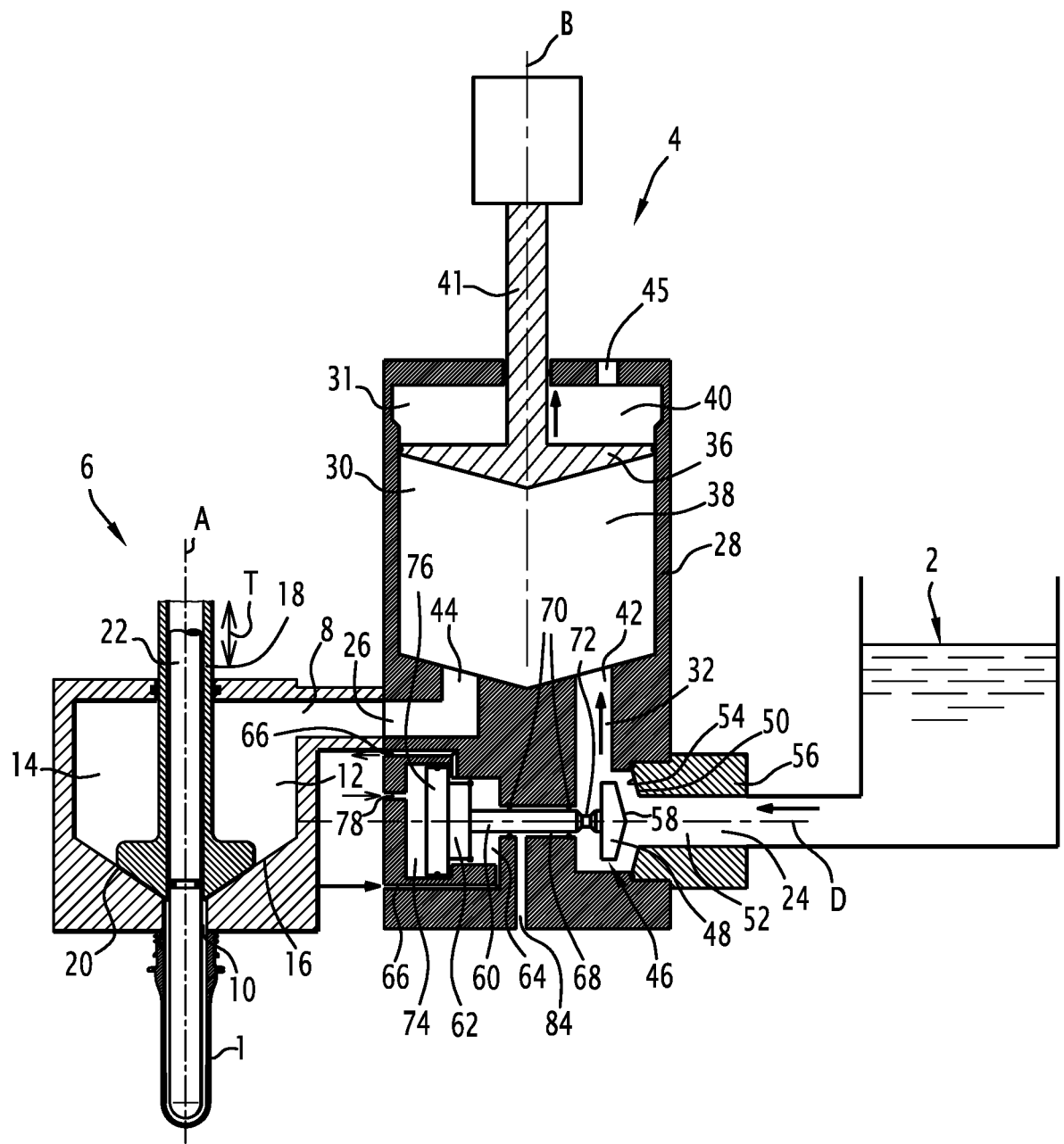
FIG. 1 is a diagrammatical axial cross-section view of a forming and filling station comprising a piston device according to a first variant of a first embodiment of the invention, the valve being in its opened position.

Referring to FIG. 1, there is described a forming and filling station for forming a preform 1 into a container and filling said container using a pressurized liquid.

The station mainly comprises: a liquid source 2, a piston device 4, and an injection device 6.

The liquid source 2 and the injection device 6 are conventional in this type of station and will not be described in great detail herein.

The injection device 6, or injection nozzle, shown in FIG. 1, comprises an inlet 8, an outlet 10 and a chamber 12 extending between the inlet 8 and the outlet 12.

The inlet 8 is connected to the outlet of the piston device as will be described subsequently.

The outlet 10 is intended to be placed in fluidic communication with a container or a preform 1, to fill said container or preform with the liquid coming from the inlet 8. In the embodiment shown in FIG. 1, the outlet 10 is connected to a preform 1, which is to be deformed to form a container, as known per se.

The chamber 12 defines an inner volume temporarily receiving the liquid to be injected via the outlet. The chamber 12 comprises a substantially regular cylindrical portion 14, extending according to an axis A and may have a constant diameter. The chamber 12 further comprises a truncated cone or pyramidal portion 16 extending between the regular cylindrical portion 14 and the outlet 10, the diameter of the chamber 12 reducing progressively from the diameter of the cylindrical portion 14 to the diameter of the outlet 10 in the conical portion 14. Axis A is preferably vertical.

A hollow control rod 18 extends in the chamber 12 along axis A. The hollow control rod 18 comprises at its end extending in the chamber 12 a sealing ring 20. The sealing ring 20 has a shape which is complementary to the shape of part of the conical portion 16 of the chamber 12, such that, when the sealing ring 20 is applied against the wall of the conical portion 16, the sealing ring 20 closes hermetically the chamber 12 and prevents liquid from flowing through the outlet 10. The hollow control rod 18 is movable in translation along axis A in the chamber 12 between an sealing position, shown in FIG. 1, wherein the sealing ring 20 is applied against the wall of the conical portion 16 and hermetically closes the chamber 12, and a injecting position, wherein the sealing ring 20 is spaced from the wall of the conical portion 16 and wherein the outlet 10 is in fluidic communication with the inlet 8 via the chamber 12.

In the case of hydraulic forming and in a conventional manner, a stretch rod 22 may extend inside the hollow control rod 18, passes through the outlet 10 and extends in the preform 1 to assist in the deformation of the preform 1 into a container, as known per se. The stretch rod 22 is movable in translation along axis A in the hollow control rod 18, as shown by arrow T of FIG. 1. The functioning of the stretching rod 22 is known and will not be described in detail herein.

The injection nozzle described above is only given by way of example of an injection device adapted for the functioning of the forming and filling station. Other injection device could be used. For example, the injection device could be implemented without a stretch rod or with a movable injection nozzle, adapted to be retracted in order to allow easy movement of the preforms or of the filled container under the injection device, as known per se.

The piston device 4 comprises an inlet 24, an outlet 26 and a main body 28 extending between the inlet 24 and the outlet 26.

The inlet 24 is intended to be connected to the source of liquid 2 intended to be injected in the containers or preforms, in order to fill said containers or form said preforms into containers. The liquid source is for example a reservoir (shown in FIG. 1). The inlet 24 can also be connected to a source of cleaning products, as will be described later.

The outlet 26 is intended to be placed in fluidic communication, for example via the injection device 4 shown in FIG. 1, with a container or a preform 1, to fill said container or preform 1 with the liquid coming from the inlet 24.

The main body 28 is for example formed of a single rigid block or is made of rigid elementary bodies rigidly fixed together, meaning that the main body 28 forms a single unit. The main body 28 is for example formed of a hollow casing.

The main body 28 defines an inner chamber 30 defining an inner volume temporarily receiving the liquid to be injected via the outlet 26. According to the embodiments shown in the figures, the inner chamber 30 comprises a substantially regular cylindrical portion, extending according to an axis B and having a constant diameter. The axis B is for example substantially parallel to the axis A.

According to the embodiment shown in the figures, the chamber 30 further comprises a cleaning portion 31 of cylindrical shape and having a diameter larger than the diameter of the regular cylindrical portion. The cleaning portion 31 extends in the continuity of the regular cylindrical portion and there is no separation between the cleaning portion and the regular cylindrical portion. The cleaning portion 31 may be coaxial with the regular cylindrical portion.

The inner chamber 30 is connected and is in fluidic communication with the inlet 24 and with the outlet 26 respectively via an upstream duct 32 and via a downstream duct 34 extending in the main body 28. The terms "upstream" and "downstream" are defined with respect to the direction of the flow of liquid circulating in the forming and filling station from the liquid source 2 to the preform 1 or container.

An injection piston 36 is placed in the inner chamber 30.

The injection piston 36 extends in the chamber and is, in normal use, in contact with the wall of the regular cylindrical portion of the chamber 30 such as to divide and separate said chamber 30 in an active portion 38 and in a complementary portion 40. This means that the injection piston 36 is of cylindrical shape, having a cross-section complementary of the cross-section of the regular cylindrical portion of the chamber 30 and a diameter equal to the diameter of the regular cylindrical portion such that the injection piston 36 has a sealing periphery in liquid tight fitting with the wall of the regular cylindrical portion of the chamber 30. A control rod 41 is attached to the injection piston 36 and extends according to axis B of the inner chamber 30. The control rod 41 advantageously extends in the complementary portion 40 of the inner chamber 30. It may occupy a reduced space of said complementary portion (i.e. the control rod 41 has a diameter which is much smaller than the diameter of the complementary portion 40).

The control rod 41 is movable in translation along axis B such that the injection piston 36 can be moved inside the inner chamber 30 between at least between a full position, wherein the volume of the active portion 38 is at its maximum, meaning that the injection piston 36 is, for example, at the top of the regular cylindrical portion of the chamber 30, and an empty position, wherein the volume of the active portion 38 is substantially null, meaning that the injection piston 36 may be at the bottom of the regular cylindrical portion of the chamber 30. Consequently, when the injection piston 36 moves from the full position to the empty position in an injecting direction, the volume of the active portion 38 decreases, while the volume of the complementary portion 40 increases, and when the piston moves from the empty position to the full position, in a filling direction, the volume of the active portion increases, while the volume of the complementary portion 40 decreases. The movement of the actuation rod 28 is for exampled controlled by a servomotor or other appropriate control means. For example, the movement of the control rod 41 could be controlled by pneumatic, electric or hydraulic means. A vent 45 is provided in the wall of the main body 28 placing the complementary portion 40 of the inner chamber 30 in fluidic communication with the atmosphere, to allow evacuation of air from the complementary portion, when the piston 36 moves in the filling direction.

The active portion 38 of the inner chamber 30 is in fluidic communication with the upstream duct 32 and with the downstream duct 34, while the complementary portion 40 is isolated in a fluid tight manner from the active portion 38 and from the upstream and downstream ducts 32 and 34 by the injection piston 36 in normal use. This means that the upstream duct 32 has a downstream end 42 opening into the active portion 38 of the inner chamber 30 and that the downstream duct 34 has an upstream end 44 opening into the active portion 38 of the inner chamber 30.

The piston device 4 further comprises a valve 46 arranged to allow the fluidic communication between the liquid source 2 and the inner chamber 30 when opened and to prevent said fluidic communication when closed, as will be described subsequently.

The valve 46 is arranged, at least in part, in the upstream duct 32, between the inlet 24 and the inner chamber 30.

Figure 2:
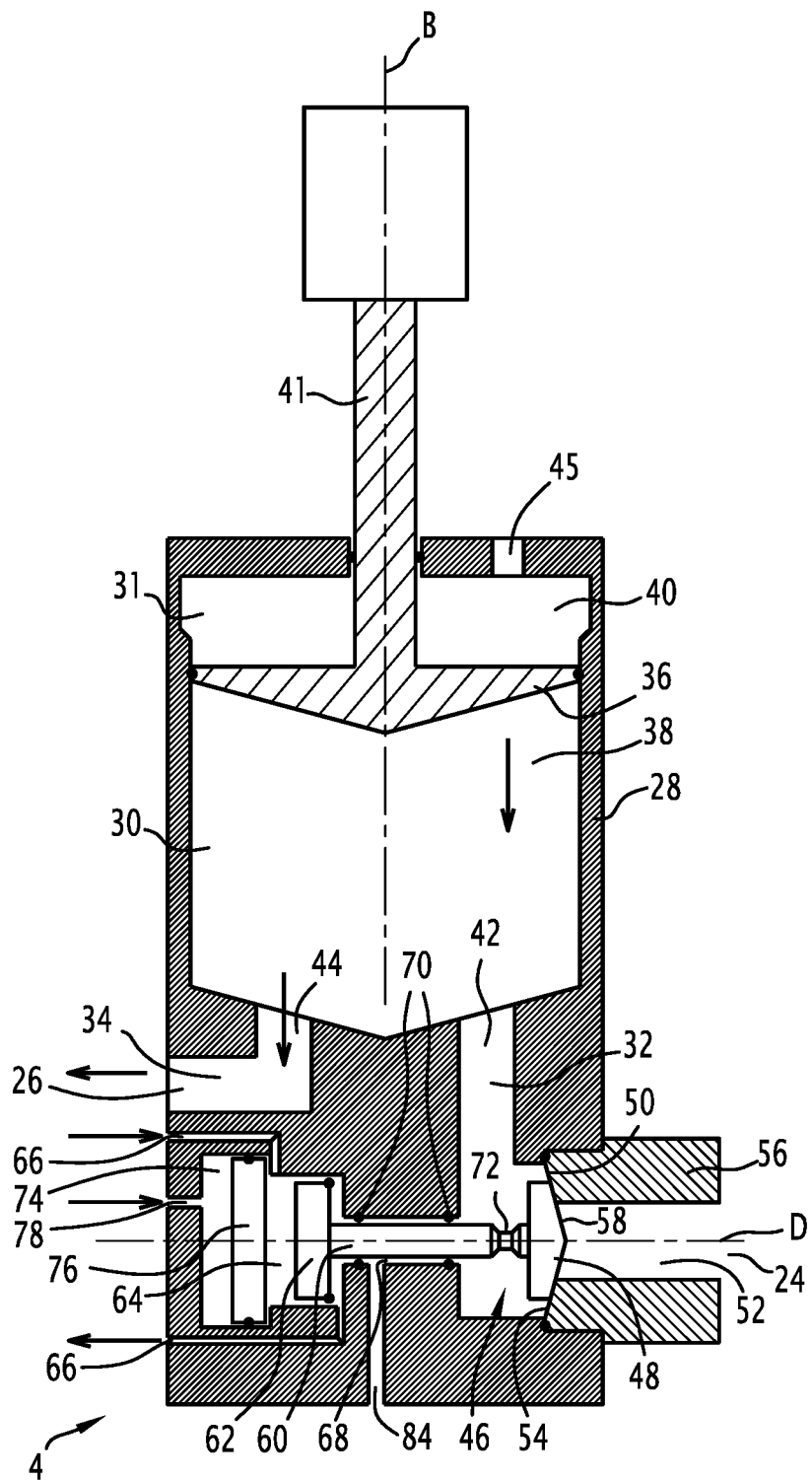
FIG. 2 is a diagrammatical axial cross-section view of the piston device of FIG. 1, the valve being in its closed position.
Figure 4:
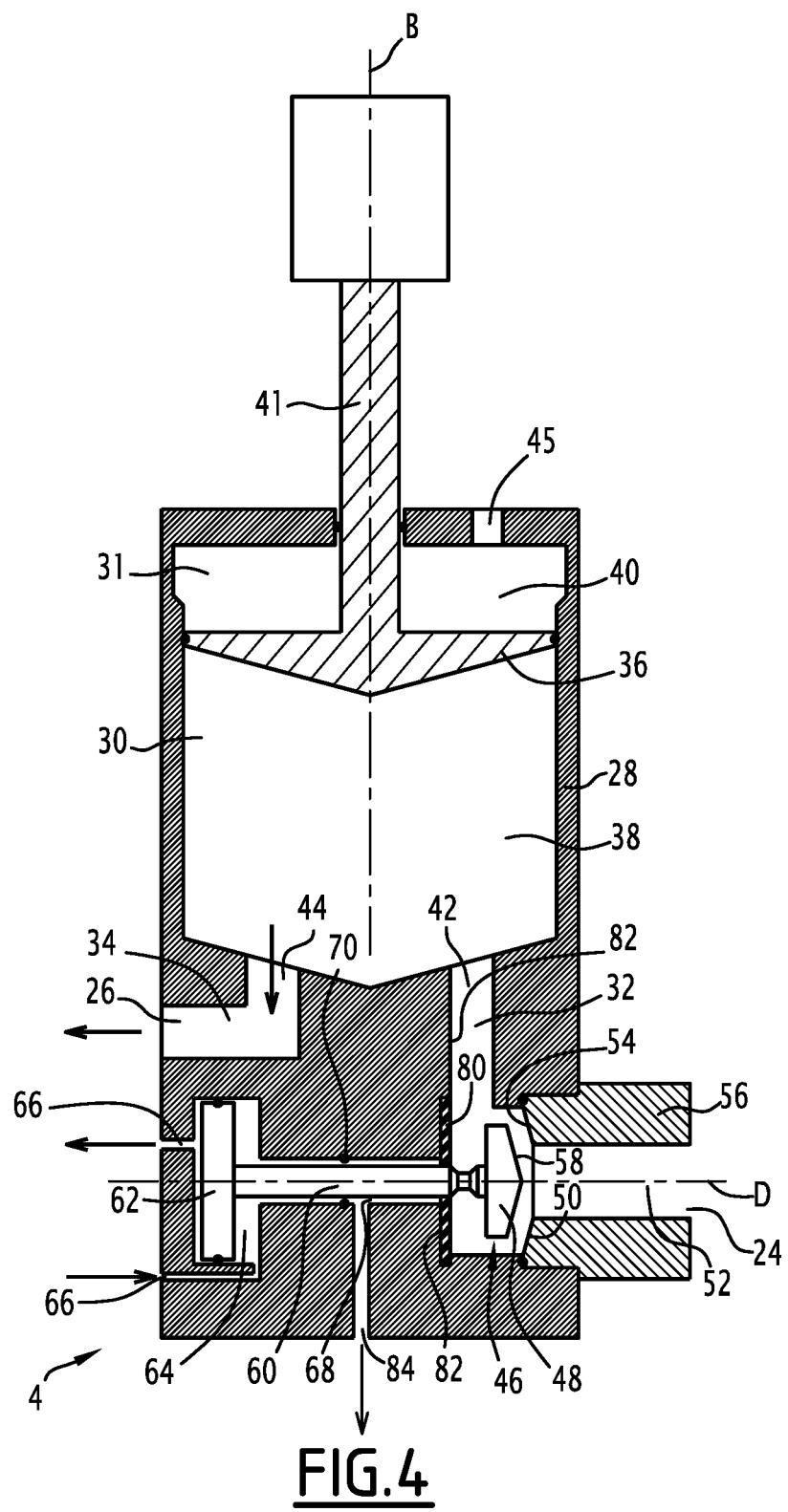
FIG. 4 is a diagrammatical axial cross-section view of a piston device according to a second variant of the first embodiment of the invention, the valve being in its opened position.
Figure 5:
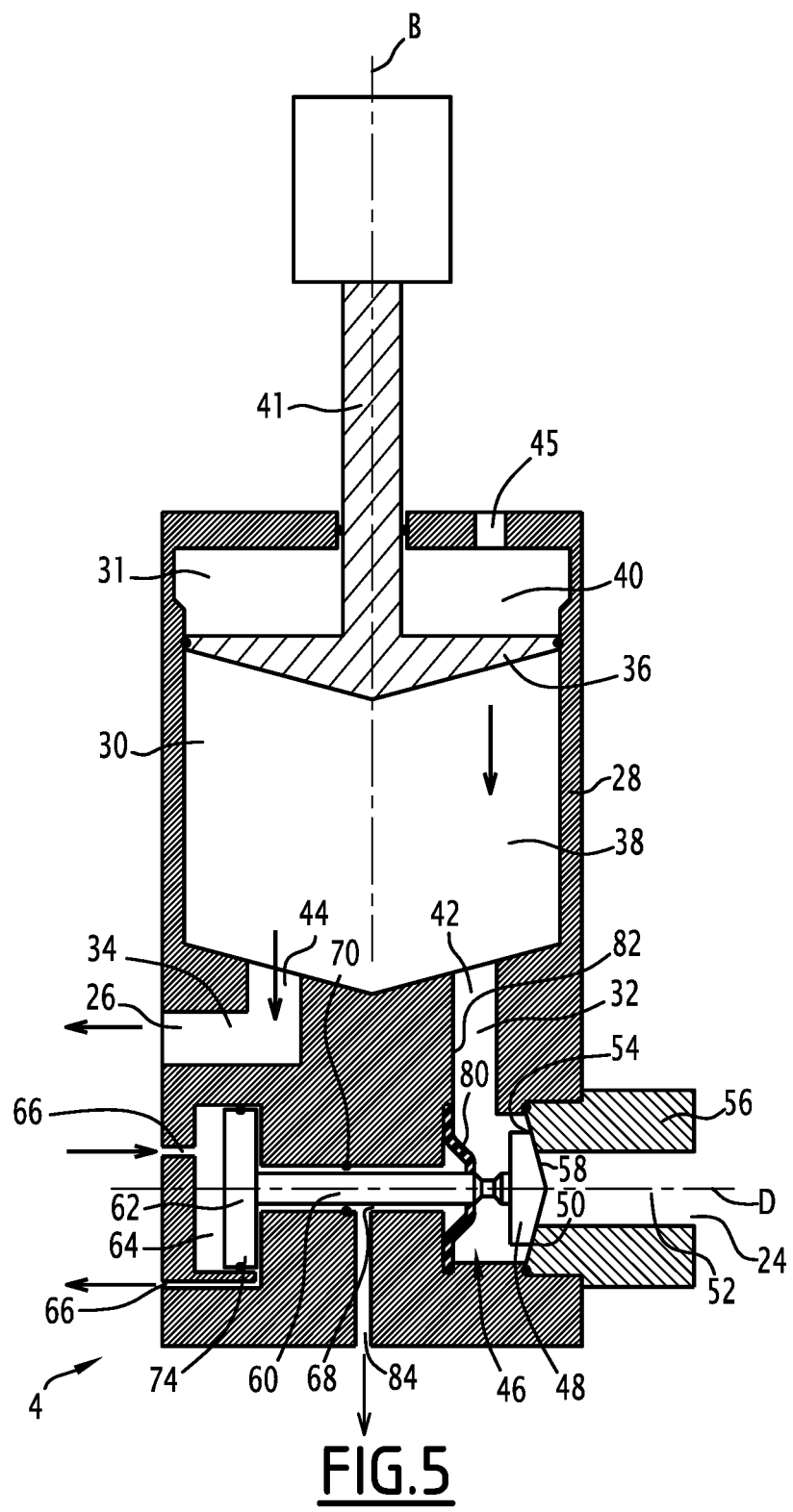
FIG. 5 is a diagrammatical axial cross-section view of the piston device of FIG. 4, the valve being in its closed position.
Figure 6:
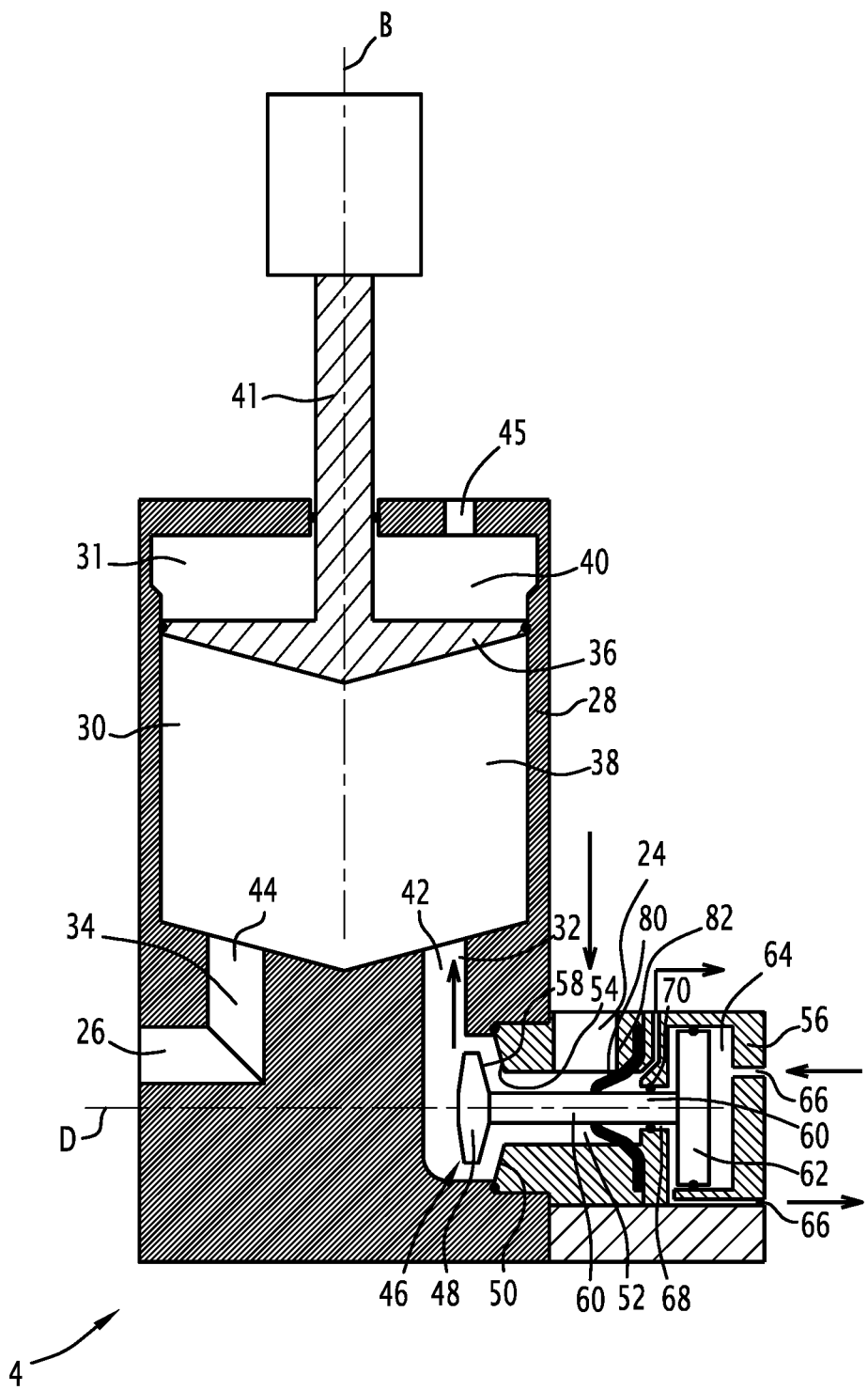
FIG. 6 is a diagrammatical axial cross-section view of a piston device according to a first variant of a second embodiment of the invention, the valve being in its opened position.
Figure 7:
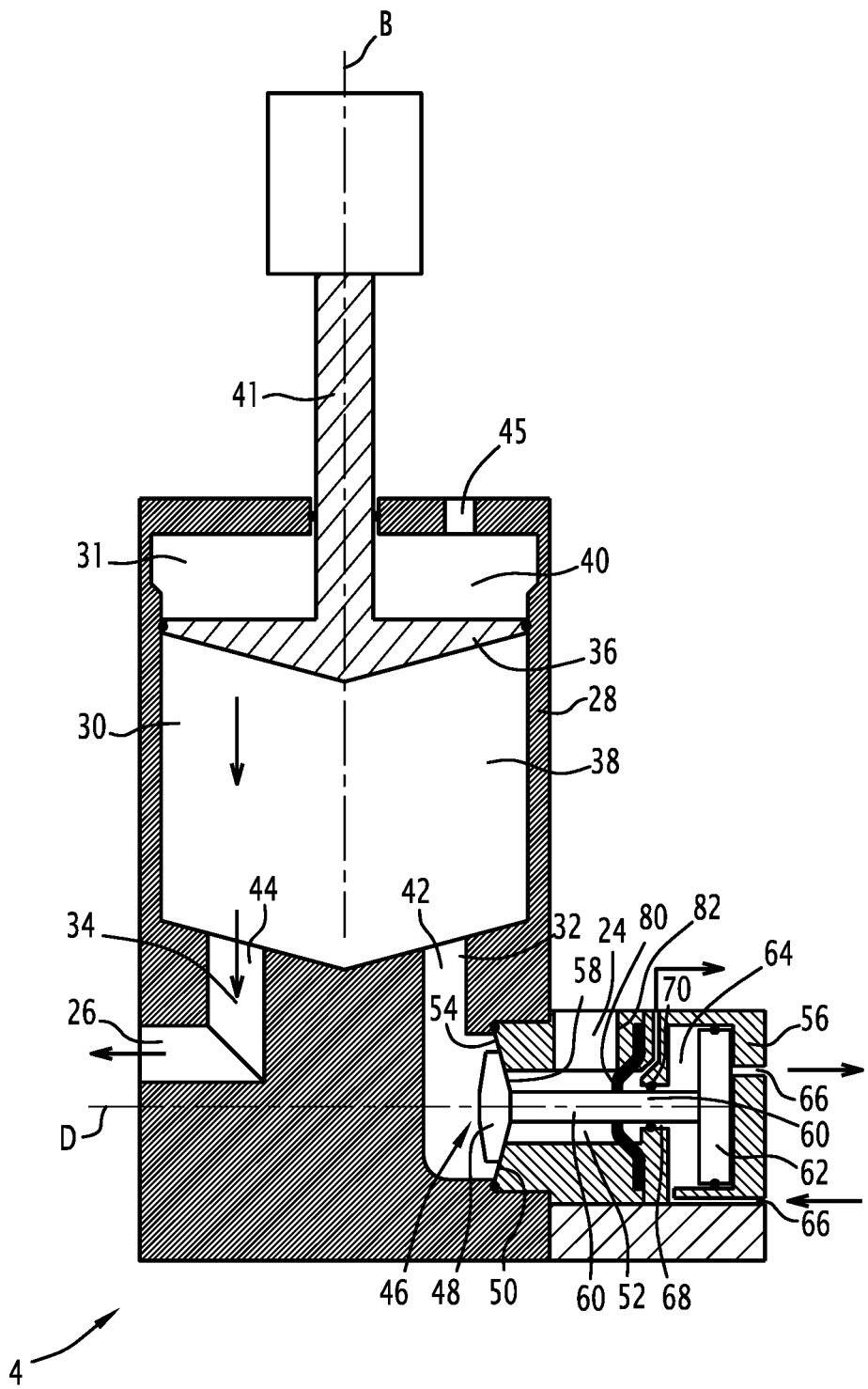
FIG. 7 is a diagrammatical axial cross-section view of the piston device of FIG. 6, the valve being in its closed position, FIG. 8 of a piston device according to a second variant of the second embodiment of the invention, the valve being in its cleaning position.

The valve 46 comprises a valve plate 48 movable along a plate actuation path relative to a valve seat 50, placed in said plate actuation path, at least between an opened position (FIGS. 1, 4, 6) and a closed position (FIGS. 2, 5, 7). In the closed position, the valve plate 48 is applied against the valve seat 50 such that the flow of liquid between the inlet 24 and the inner chamber 30 is interrupted, while in the opened position, the valve plate 48 is spaced from the valve seat 50 in order to allow the liquid to flow from the inlet 24 to the inner chamber 30.

The valve seat 50 comprises a central bore 52 extending between the inlet 24 and the inner chamber 30, through which the liquid can flow when the valve 46 is in the opened position. The central bore 52 extends along an axis D, which itself extends in the plate actuation path direction, corresponding to the direction of translation of the valve plate 48 when it moves between the opened position and the closed position. The downstream end of the central bore 52 opens in the upstream duct 32.

A bearing surface 54, for receiving the valve plate 48 in the closed position, extends radially around the downstream end of the central bore 52. According to the embodiment shown in the figures, the bearing surface 54 is part of a wall of a seat body 56 attached to the main body 28 in a fluid tight manner More particularly, the seat body 56 is attached to an opening of the main body 28 forming the upstream end of the upstream duct 32, such that the central bore 52 opens in the upstream duct 32 as described previously. Consequently, the bearing surface 54 faces the upstream duct 32 and forms the upstream end thereof.

According to the embodiment shown in the figures, the bearing surface 54 has a conical shape around the central bore 52, such that the diameter of the bearing surface 54 of the valve seat 50 increases from the central bore 52 towards the upstream duct 32 in the upstream-downstream direction. The valve plate 48 has a conical closing surface 58 substantially complementary to the conical shape of the bearing surface 54 and facing said bearing surface 54. In a variant, the bearing surface 54 and the closing surface 58 could have any shape arranged such that the closing surface 58 intimately mates with the bearing surface 54 when the valve plate 48 is applied against the valve seat 50 in the closed position of the valve plate 48 and therefore closes the central bore 52 in a fluid tight manner, as shown in FIGS. 2, 5, 7 and 8.

The valve 46 further comprises actuation means for moving the valve plate 48 between its closed and opened positions. The actuation means comprise an actuation rod 60 attached at one of its end to the valve plate 48 and extending along axis D extending in the plate actuation path direction. The actuation rod 60 is movable in translation along axis D to move the valve plate 48 between its closed and opened position. The movement of the actuation rod 60 is controlled by an actuator attached to the other end of the actuation rod 60, opposite the valve plate 48 and isolated in a fluid tight manner from the upstream duct 32, at least when the valve plate moves between the opened position and closed position of the valve plate 48, as will be described subsequently.

The actuator, for example, comprises an actuation piston 62 movable inside an actuation chamber 64, which is isolated in a fluid tight manner from the upstream duct 32, at least when the valve plate moves between the opened position and closed position of the valve plate 48, as will be described subsequently. The actuation piston 62 is substantially perpendicular to axis D. The actuation piston 62 is placed in fluid tight contact with the wall of the actuation chamber 64 such that said actuation chamber 64 is divided in two sub-chambers isolated in a fluid tight manner from each other by the actuation piston 62, at least when the valve plate 48 moves between the opened position and the closed position. Each of said sub-chambers is connected to an actuation fluid source, for example via ducts 66 opening into said sub-chambers. By injecting the actuation fluid into one of said sub-chambers and by allowing the actuation fluid to evacuate from the other sub-chambers, the actuation piston 62 can be moved in a known manner to displace the actuation rod 60, and hence the valve plate 48, along axis D, between the opened and closed position of the valve plate 48. The actuation fluid is for example air, but another actuation gas or actuation liquid could also be used.

The actuation rod 60 for example extends in an actuation duct 68 extending between the actuation chamber 64 and the upstream duct 32 and having a diameter slightly larger than the diameter of the actuation rod 60. The actuation duct 68 is coaxial with the actuation rod 60 and allows the movement in translation of the actuation rod 60 along axis D.

According to the first embodiment shown in FIGS. 1 to 5, the actuation chamber 64 and the actuation duct 68 are formed in the main body 28 and the actuation rod 60 extends downstream of the valve plate 48 between the valve plate 48 and the actuation piston 62. This means that the actuation rod 60 is connected to the surface of the valve plate 48 which is opposite the closing surface 58 of the valve plate 48. According to this embodiment, the actuation chamber 64 and the actuation duct 68 are therefore defined by the same body, which also defines the inner chamber 30, the upstream duct 32 and the downstream duct 34. The actuation chamber 64 and the actuation duct 68 for example extend under the inner chamber 30 and the downstream duct 34 and opposite the upstream duct 32. Such an arrangement of the main body 28 allows providing the piston device with the valve 4 in a particularly compact casing.

Figure 8:
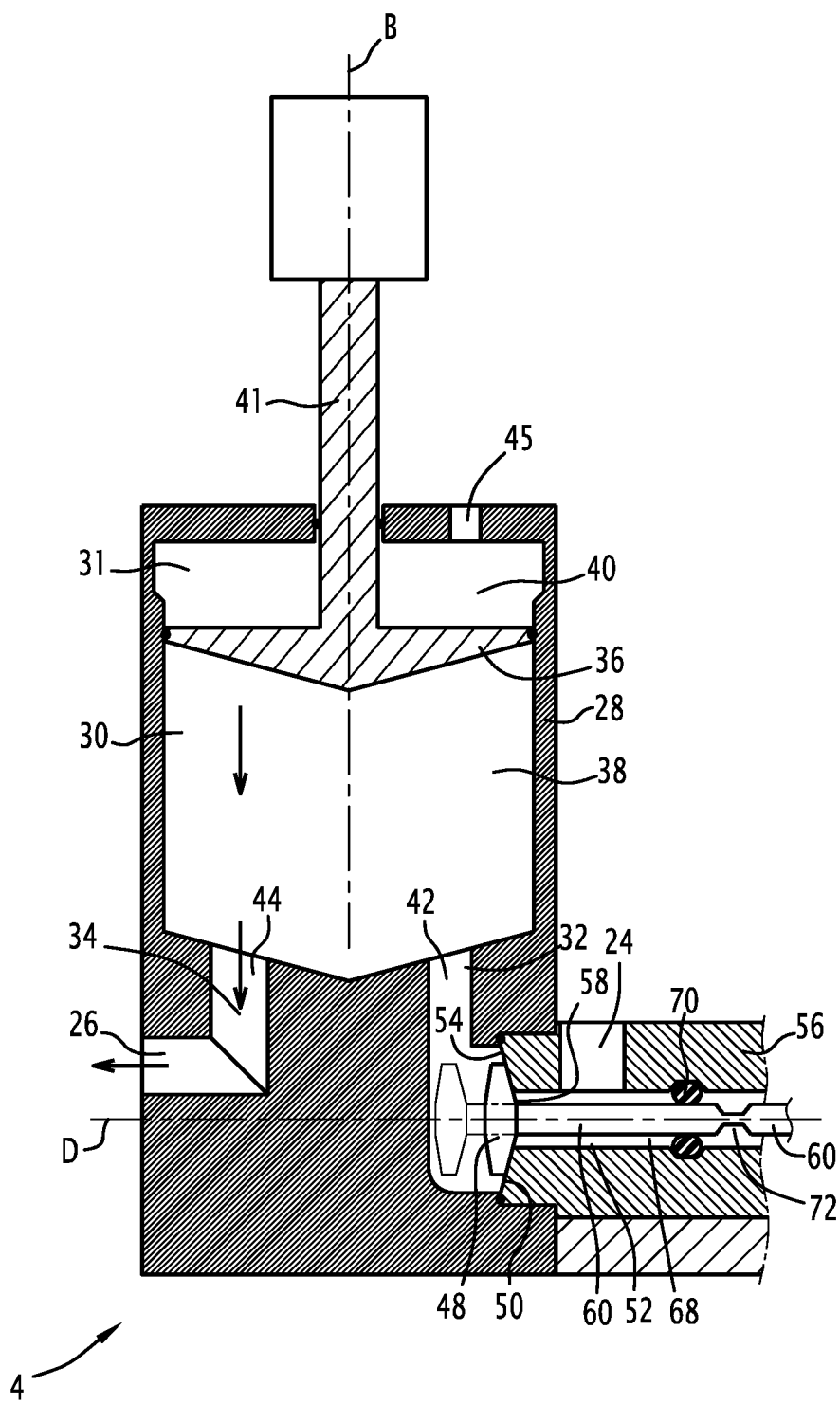

According to the second embodiment shown in FIGS. 6 to 8, the actuation chamber 64 and the actuation duct 68 are formed in the seat body 56 and the actuation rod 60 extends upstream of the valve plate 48 between the valve plate 48 and the actuation piston 62. This means that the actuation rod 60 is connected to the closing surface 58 of the valve plate 48. In this embodiment, the inlet 24 of the piston device is for example placed between the actuation chamber 64 and the upstream duct 32. In this embodiment, the space requirement of the piston device is slightly more important than that of the first embodiment, but the valve 46 can more easily be accessed or can be replaced simply by separating the seat body 56 from the main body 28 in case of malfunction for example.

For isolating the actuation chamber 64 from the upstream duct 32, different sealing means can be implemented between the actuation chamber 64 and the upstream duct 32, the actuation rod 60 passing through said sealing means. The various sealing means which will now be described can be adapted to the first embodiment as well as to the second embodiment, as can be seen in the figures.

Figure 3:
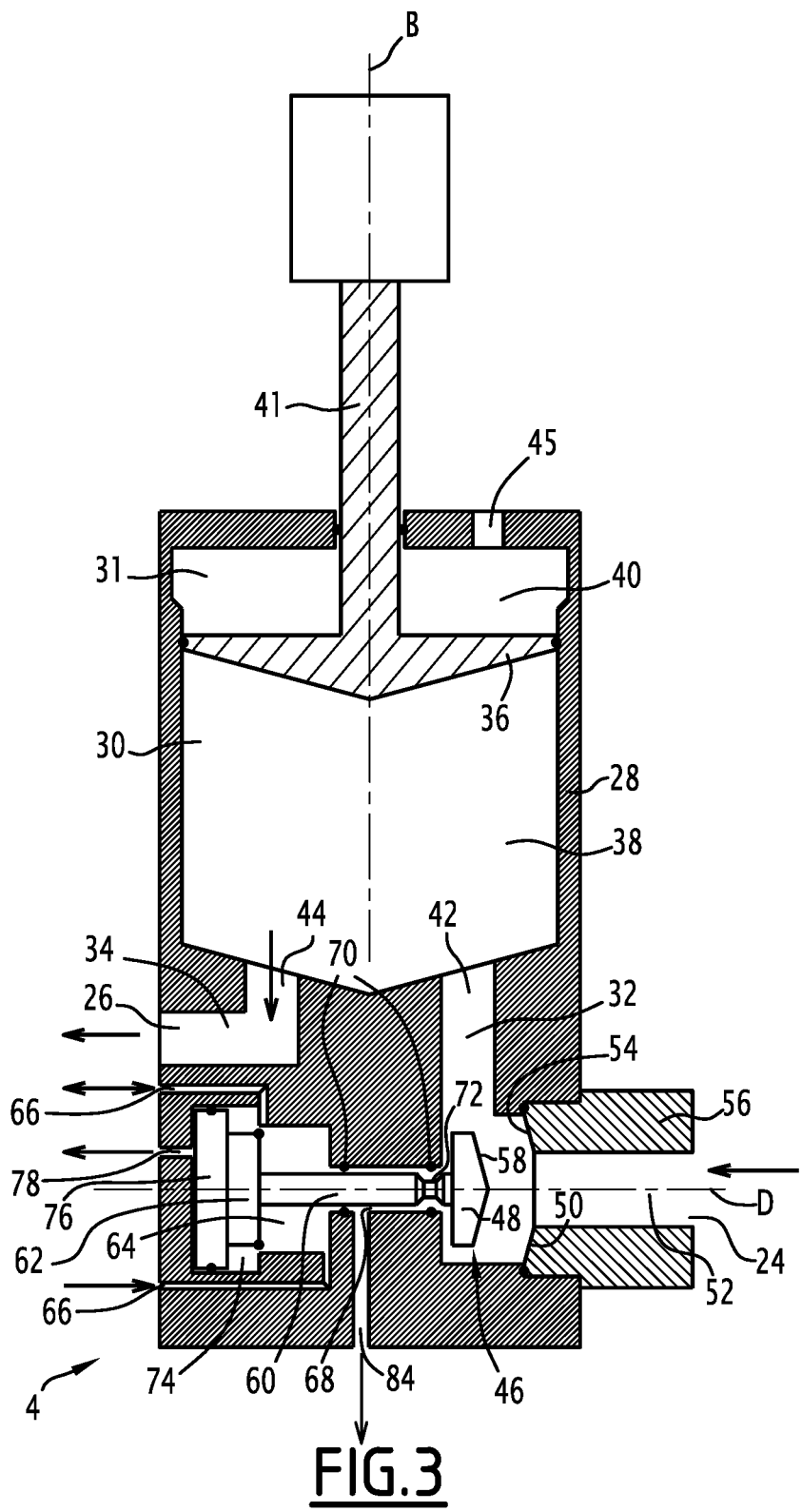
FIG. 3 is a diagrammatical axial cross-section view of the piston device of FIG. 1, the valve being in its cleaning position.

According to a first variant shown in FIGS. 1 to 3 and 8, the sealing means are formed by an annular seal ring 70 arranged between the wall of the actuation duct 68 and the actuation rod 60, preventing the liquid flowing in the upstream duct 32 from flowing in the actuation chamber 64. The seal ring 70 is for example attached to the wall of the actuation duct 68 and is arranged to slide on a sliding area of the surface of the actuation rod 60, while maintaining a fluid tight contact between the seal ring 70 and the actuation rod 60, at least between the opened position and closed position of the valve plate 48. The actuation rod 60 further comprises at least one communication groove 72, where the diameter of the actuation rod 60 is reduced such that, when the communication groove 72 is placed opposite the seal ring 70, a fluidic communication between the actuation duct 68 and the upstream duct 32, and possibly between the actuation chamber 64 and the upstream duct 32, is established, as shown in FIG. 3. Such a fluidic communication allows cleaning of the actuation rod 60, possibly of the actuation chamber 64, as will be described subsequently. According to the embodiment shown in the figures, two seal rings 70 are provided substantially at each end of the actuation duct 68, in which case, the actuation rod 60 can comprise two communication grooves 72, which are spaced from each other with a distance substantially equal to the distance separating the two seal rings 70, such that when a communication groove 72 is placed opposite a seal ring 70, the other communication groove 72 is also placed opposite the other seal ring 70, thereby placing the upstream duct 32 in fluidic communication with the actuation chamber 64. According to the particular embodiment shown in the figures, the actuation duct 68 can comprise two seal rings 70 and the actuation rod can comprise a single actuation groove 72, such that only the actuation duct 68 is placed in fluidic communication with the upstream duct 32 while the actuation chamber 64 remains isolated from the upstream duct 32.

Alternatively, the seal ring(s) 70 can be attached around the actuation rod 60 and be arranged to slide on a sliding area of the actuation duct 68 while maintaining a fluid tight contact between the seal ring 70 and the actuation rod 60, at least between the opened position and closed position of the valve plate 48. In this case, the communication groove(s) 72 is/are provided in the wall of the actuation duct 68.

According to the first variant, the actuation chamber 64 comprises a cleaning area 74 arranged at the end of the actuation chamber 64 which is opposite to the actuation duct 68. The diameter of the cleaning area 74 is greater than the diameter of the actuation piston 62, such that, when the actuation piston is in the cleaning area 74, the actuation piston is no longer in fluid tight contact with the wall of the actuation chamber 64. Consequently, when the actuation piston 62 is in the cleaning area 74, liquid is able to flow around the actuation piston 62, as will be described subsequently. The valve 46 is arranged such that, when the communication groove(s) 72 is/are placed opposite the seal ring(s) 70, the actuation piston 62 is in the cleaning area 74 of the actuation chamber 64, as shown in FIG. 3.

An additional piston 76 is placed in the cleaning area 74 of the actuation chamber 64 and has a diameter substantially equal to the diameter of the cleaning area 74 such that the additional piston is in fluid tight contact with the wall of the cleaning area 74. The actuation piston 68 is placed between the additional piston 76 and the actuation duct 68. Consequently, the additional piston 76 extends on the side of the actuation piston 62 opposite to the face of the actuation piston 62 attached to the actuation rod 60. The additional piston 76 is substantially parallel to the actuation piston 62. It is therefore understood that, by injecting an actuation fluid in the empty part of the cleaning area 74 which is delimited by the face of the additional piston 76 which is opposite the side extending in regard of the actuation piston 62, it is possible to move the additional piston 76 in the cleaning area 74 such that the additional piston 76 pushes the actuation piston 62 towards the actuation duct 68, in an active portion of the actuation chamber 64, wherein the actuation piston 62 is in fluid tight contact with the wall of the actuation chamber 64. Such a pushing of the actuation piston 62 allows replacing the actuation piston 62 in the part of the actuation chamber 64 having the same diameter than the actuation piston 62, after the actuation piston 62 has been placed in the cleaning area 74 of the actuation piston 62. A duct 78 for example places the empty part of the cleaning area 74 with an actuation fluid source.

According to second variant shown in FIGS. 4 to 7, the seal ring 70 placed in the vicinity of the upstream duct 32 is replaced by a flexible membrane 80 attached to the actuation rod 60 and to an attachment wall 82, and separating the upstream duct 32 and the actuation duct 68. The flexible membrane 80 for example extends radially around the actuation rod 60 and is attached by its periphery to the attachment wall 82. According to the embodiment shown in FIGS. 6 and 7, the periphery of the flexible membrane 80 is placed in a notch provided in the attachment wall 82. The membrane allows the displacement of the actuation rod 60 and thus of the valve plate 48 by deforming in an elastic manner, as shown in FIGS. 5 and 6. The membrane allows a particularly efficient sealing of the actuation chamber 64 and of the actuation duct 68, guarantying that the fluid flowing in the upstream duct 32 will not penetrate in the actuation duct 68 and hence, in the actuation chamber 64.

Furthermore, a leaking duct 84 can be arranged between the actuation chamber 64 and the seal ring 70 placed in the vicinity of the upstream duct 32 or the flexible membrane 80. The leaking duct places the actuation duct 68 in fluidic communication with the exterior of the piston device, thereby allowing a fluid located between the sealing means and the actuation chamber 64 to be evacuated.

The functioning of the piston device and of the station described above will now be described. It should be noted that the functioning in normal use, i.e. during the forming and filling of a container, is substantially the same for all embodiments and variants described above.

The piston device 4 is placed in fluidic communication with a liquid source 2 in order to place the inlet 24 in fluidic communication with the liquid source, as shown in FIG. 1. It should be noted that with the piston device according to the invention, there is no need of a valve placed between the inlet 24 and the liquid source 2, said valve being replaced by the valve 46 placed downstream of the inlet 24.

A first phase or filling phase comprises a setting step and a filling actuation step. During the setting step, the valve plate 48 is placed in the opened position to allow liquid to flow between the liquid source 2 and the inner chamber 30. To this end, the actuation means of the valve plate 48 are actuated by filling one of the sub-chambers of the actuation chamber 64 with the actuation fluid such that the actuation piston 62 is moved along axis D to move the valve plate 48 from its closed position to its opened position, shown in FIGS. 1, 4 and 6, and, in dotted lines, in FIG. 8. It should be noted that; in the first embodiment, the sub-chamber to be filled for moving the valve plate 48 from its closed position towards its opened position, is the sub-chamber in which the actuation rod 60 extends, i.e. the sub-chamber that is the closest from the upstream duct 32. In the second embodiment, the sub-chamber to be filled is the sub-chamber which extends on the side of the actuation piston 62 that does not carry the actuation rod 60, i.e. the sub-chamber that is the farthest from the upstream duct 32.

It should be noted that the movement of the valve plate 48 between the closed and opened positions, which forms part the actuation path of the valve plate 48, takes place at least in part inside the upstream duct 32. According to the first and embodiments, the actuation path extends integrally in the upstream duct 32, such that the valve plate 48 extends in the upstream duct 32 both in the opened and closed positions. Consequently, the valve plate 48 extends in the vicinity of the inner chamber 30 of the main body 28, which makes a very compact piston device.

More particularly, the plate actuation path can be arranged such the valve plate 48 extends upright of the inner chamber 30 of the main body 28 in both the opened position and the closed position and remains upright of the inner chamber 30 between these two positions. In other words, the projection of the valve plate 48 in a plane substantially perpendicular to the axis B of the inner chamber 30 remains, in both positions, inside the contour defined by the projection of the inner chamber in said plane. This means that the valve plate 48 extends in a cylinder extending along axis B and having the same radius as the regular cylindrical portion of the inner chamber 30 when the valve plate 48 moves between its opened and closed positions, which means that the valve plate extends very close from the inner chamber 30 of the main body 28. It should be noted that the conical shape of the closing surface 58 of the valve plate 48 and of the bearing surface 54 reduces the friction between the valve plate 48 and the valve seat 50, thereby decreasing the force needed to move the valve plate 48 from its closed position to its opened position.

Additionally, during the setting step of the filling phase, the control rod 18 of the injection device 6 is placed in its sealing position such that the chamber 14 is closed.

Once, the valve plate is in the opened position, and when the chamber 14 of the injection device 6 is closed, the filling actuation step can take place. The injection piston 36 is moved in the filling direction in the regular cylindrical portion of the inner chamber 30 by appropriate control means of the movement of the control rod 41. The movement of the injection piston 36 in the filling direction causes liquid to be drawn in the active portion 38 of the inner chamber 30 from the liquid source through the inlet 24. The volume of the active portion 38 increases as the injection piston 36 is moved in the filling direction, thereby causing the active portion 38, and hence the chamber 14 of the injection device 6, to be filled with the liquid.

The piston device 4 according to the invention enables to precisely dose the quantity of liquid to be injected through the outlet 26 in a simple manner by stopping the movement of the injection piston 36 in the filling direction once the desired volume of the active portion 38 of the inner chamber 30, corresponding to volume of liquid to be injected, is reached.

Once the active portion 38 is filled with liquid, a second phase or injecting phase comprises a setting step and an injecting actuation step. During said setting step, the valve plate 48 is moved in the closed position to prevent liquid to flow back towards the liquid source 2. To this end, the actuation means of the valve plate 48 are actuated by filling the other of the sub-chambers of the actuation chamber 64 with the actuation fluid such that the actuation piston 62 is moved along axis D to move the valve plate 48 from its opened position to its closed position, shown in FIGS. 2, 5 and 7, and, in hard lines, in FIG. 8. It should be noted that, in the first embodiment, the sub-chamber to be filled for moving the valve plate 48 from its opened position towards its closed position, is the sub-chamber which extends on the side of the actuation piston 62 that does not carry the actuation rod 60, i.e. the sub-chamber that is the farthest from the upstream duct 32. In the second embodiment, the sub-chamber to be filled is the sub-chamber in which the actuation rod 60 extends, i.e. the sub-chamber that is the closest from the upstream duct 32. The movement of the actuation piston 62 causes the other sub-chamber to be emptied, the actuation fluid being evacuated via the duct 66 communication with the actuation fluid source.

Once the valve plate 48 is in its closed position, the fluidic communication between the inner chamber 30 and the liquid source 2 is interrupted.

The setting step of the injection phase also comprises moving the control rod 18 of the injection device 6 to its injecting position, thereby placing the chamber 14, and consequently the active portion 38 of the inner chamber 30, in fluidic communication with a container or a preform 1 in which the liquid is to be injected via the outlet 10 of the injection device 1.

In the injecting actuation step, or injecting step, the injection piston 36 is moved in the injecting direction. This movement causes the liquid to flow from the active portion 38 through the outlet 26 in the container or preform, via the injection device 6, until the active portion 38 is emptied.

It should be noted that, when the injection device 6 is connected in a fluid tight manner with the opening of the preform 1, the pressure of the liquid in the preform 1, in the chamber 14, in the active portion 38 and in the upstream duct 32 is greater than the pressure of the liquid in the liquid source 2, which may be at the atmospheric pressure. During the injecting actuation step, the liquid in the upstream duct 32 is pressed against the valve plate 48, which, in turn, is pressed against the valve seat 50, thereby guarantying that the valve plate 48 firmly remains in its closed position during the injecting step. This can be arranged because the valve plate 48 is placed between the valve seat 50 and the inner chamber 30 thereby ensuring that the pressure of the liquid in the inner chamber 30 will apply a force on the valve plate 48 towards its closed position. Consequently, there is no need to apply a particular pressure in the actuation chamber 64 to maintain the valve plate 48 in its closed position.

The pressure of the liquid at the outlet 26 can be controlled through the speed of the injection piston 36 moving in the injecting direction. The pressure control is important in particular when the liquid to be injected has to deform a preform to shape it into a container, this deformation being performed at high pressure.

It should be noted that, if the valve 46 is damaged or is mounted in a wrong manner, causing a liquid to flow in the actuation duct 68, either from the upstream duct or from the actuation chamber, in normal use of the piston device 6, such a leak can be easily detected since the liquid flowing in the actuation duct 68 will be evacuated in the leaking duct 84.

As can be understood from the description above, the control of the injection of liquid can be easily controlled by controlling the injection piston 36 and the actuation piston 60 without needing extra valves, which are complicated to control and to clean.

A cleaning phase of the piston device 4 will now be described.

The injection piston 36, the inner chamber 30, the upstream duct 32 and the downstream duct 34 can easily be cleaned simply by replacing the liquid source 2 by a cleaning products source and by actuating the injection piston 36 while the valve plate 48 is in its opened position.

During this cleaning step, the inlet 24 is placed in fluidic communication with a cleaning products source, such as water, optionally mixed with cleaning agents for example, and the outlet 26 is placed in fluidic communication, via the injection device 6, with a container dedicated for this cleaning step, known as a dummy container. The dummy container therefore replaces the preform 1 shown in FIG. 1. The dummy container comprises an outlet which is in fluidic communication with the cleaning products source. Consequently, a closed loop is formed between the cleaning products source and the dummy container, the cleaning products being able to flow from the source through the piston device 4, through the injection device 6 and through the dummy container and back to the source.

The cleaning products is caused to fill the inner chamber 36 by appropriated movement of the injection piston 36 and of the control rod 18, as described above in relation with the normal use of the piston device 4, for example by a succession of filling phases and injecting phases.

The injection piston 36 is then caused to move up and down in the regular cylindrical portion of the inner chamber 30, alternatively in the filling and in the injecting directions, thereby making the cleaning products to circulate between the active portion 38 of the inner chamber 30 and the dummy container. This operation constitutes a regular cleaning of the piston device 6 and of the injection device 6 and allows to clean the inner chamber 30, the upstream duct 32, the downstream duct 34, the injection device 6 and the face of the injection piston 36 extending in the active portion 38 of the inner chamber 30.

For a more complete cleaning of the injection piston 36, the injection piston 36 can be moved up to the cleaning portion 31 of the inner chamber 30, where the cleaning products can flow all around the injection piston 36. For example, the valve plate 48 may be in its closed position and the cleaning product source may be connected to the vent 45. In the cleaning portion 41, an up and down movement of the injection piston 36 can be performed in the cleaning portion 41 to create turbulences in the flow of the cleaning products in the inner chamber 30, thereby ensuring a stirring of the cleaning products all around the injection piston 12 and around the control rod 41.

According to the first variant of the first and second embodiments of the piston device, it is also possible to clean the actuation rod 60 and possibly the actuation chamber 64, during the cleaning of the inner chamber 30 and of the upstream and downstream ducts as described above. Indeed, the valve plate 48 can be placed in a cleaning position, shown in FIG. 3, wherein the communication groove 72 is/are placed opposite the seal ring(s) 70, thereby placing the actuation duct 68 in fluidic communication with the upstream duct 32. The cleaning position of the valve plate 48 belongs to the actuation path of the valve plate 48 and is located passed the opened position with respect to the closed position, i.e. more downstream than the opened position in the first embodiment and more upstream than the opened position in the second embodiment. In the cleaning position, the actuation piston 62 is further located in the cleaning area 74 of the actuation chamber 64, when such a cleaning area 74 is provided. Consequently, in the cleaning position, the cleaning products are able to flow in the actuation duct 68, thereby cleaning the actuation duct 68 and the actuation rod 60. When two communication grooves 72 are provided, the cleaning products are further able to flow in the actuation chamber 64, thereby cleaning said actuation chamber 64 and the face of the actuation piston 62 facing the actuation duct 68. Furthermore, when the actuation piston 62 is placed in the cleaning area 74 of the actuation chamber 64, the cleaning products are able to flow all around the actuation piston 62, thereby cleaning it entirely. When the valve 46 has to return in its normal state, the additional piston 76 is used to move the actuation piston 62 out of the cleaning portion 74 of the actuation chamber 64 and to move the communication groove(s) 72, respectively the seal ring(s) 70, passed the seal ring(s) 70, respectively the communication groove (s) 72, to restore the fluid tight contact between the actuation rod 60 and the actuation duct 68. Once the cleaning is performed, the cleaning products can be evacuated by the leaking duct 84.

In the case where the actuation rod 60 cannot be moved to place the actuation duct 68 and/or the actuation chamber 64 in fluidic communication with the upstream duct 32, the cleaning of the actuation chamber 64, and possibly of the actuation duct 68 if a fluidic communication between the actuation chamber 64 and the actuation duct 68 can be established, can be performed by replacing the actuation fluid source by a cleaning products source.

As mentioned previously, the piston device 4 according to the invention is particularly compact, mainly in the first embodiment, while the second embodiment, requiring slightly more space, allows an easy access to the various components of the valve 46.

The valve seat 50 has been described as extending at the inlet of the upstream duct 32. However, the valve seat 50 could be placed more upstream in the seat body 56 as long as part of the plate actuation path extends in the upstream duct 32, meaning that the valve plate 48 extends in the upstream duct 32 in at least one of its positions.

The actuator of the valve plate 48 has been described as a piston 62. However, other kind of actuators, such as a servomotor, could be used to move the valve plate 48.

The invention claimed is:

1. A piston device for a forming and filling station for forming a preform into a container and filling said container using a pressurized liquid, the piston device comprising:
   an inlet through which the piston device can receive liquid;
   an outlet through which the piston device can inject the pressurize liquid;
   a main body defining an inner chamber, a downstream duct and an upstream duct, the upstream duct being separate and apart from the downstream duct, the upstream duct fluidically communicating the inner chamber with the inlet, the upstream duct defining an opening into the inner chamber at a downstream end of the upstream duct, the downstream duct fluidically connecting the inner chamber with the outlet;
   an injection piston movable inside the inner chamber separating the inner chamber into an active portion and a complementary portion, the injection piston isolating the active portion from the complementary portion, the active portion being in fluidic communication with both the upstream duct and the outlet; and
   a valve including a valve plate and a valve seat, the valve seat having a bearing surface facing in a downstream direction, the valve plate being movable along a plate actuation path between an opened position, wherein liquid is allowed to flow into the active portion of the inner chamber from the inlet, and a closed position, wherein the valve plate is applied against the bearing surface in a fluid tight manner and liquid is prevented from flowing from the active portion into the inlet, and the plate actuation path extending at least in part inside the upstream duct, the valve plate being located upstream of the opening into the inner chamber and traveling in an upstream direction when moving from the opened position to the closed position.

2. The piston device according to claim 1, wherein the inner chamber and the upstream duct are located inside the main body, and wherein the main body forms a single rigid block or is made of rigid elementary bodies rigidly fixed together.

3. The piston device according to claim 1, wherein the valve seat is defined as an axially facing surface of a seat body mounted to a bore of the main body in a fluid tight manner and includes a central bore forming the inlet of the piston device, the valve plate extending between the valve seat and the inner chamber such that, when the active portion of the inner chamber is filled with liquid and the injection piston moves to reduce the volume of the active portion, a force applied by the liquid urges the valve plate into the closed position and against the valve seat.

4. The piston device according to claim 1, wherein the valve comprises an actuator connected to the valve plate, the valve plate being moveable between its closed position and opened position by the actuator.

5. The piston device according to claim 1, wherein an actuation rod is attached to the valve plate and is movable in translation and an actuator is attached to the actuation rod opposite the valve plate, the actuator being isolated in a fluid tight manner from the upstream duct, at least when the valve plate moves between the opened position and closed position of the valve plate.

6. The piston device according to claim 5, wherein the actuator comprises an actuation piston placed in fluid tight contact with a wall of an actuation chamber, the actuation piston being movable inside the actuation chamber using an actuation fluid, the valve comprising a seal engaging the actuation rod and fluidically isolating the actuation chamber from the upstream duct, the actuation rod passing through the seal to connect the actuation piston to the valve plate.

7. The piston device according to claim 6, wherein the actuation chamber is defined by the main body and the actuation rod extends downstream of the valve plate between the valve plate and the actuation piston.

8. The piston device according to claim 6, wherein a valve seat is formed by a wall of a seat body attached to the main body in a fluid tight manner, the actuation chamber being defined by the seat body and the actuation rod extending upstream of the valve plate between the valve plate and the actuation piston.

9. The piston device according to claim 6, wherein the seal comprises a flexible membrane attached to an attachment wall of an actuation duct and to the actuation rod, the flexible membrane separating the actuation chamber from the upstream duct and being deformable to allow the movement of the actuation rod relative to the actuation duct.

10. The piston device according to claim 6, wherein the valve plate is movable into at least one cleaning position located past the opened position with respect to the closed position, an actuation duct separating the actuation chamber and the upstream duct, and wherein the seal is a seal ring attached to one of the actuation duct and of the actuation rod, the other of the actuation duct and the actuation rod having a sliding area along which the seal ring slides during the relative movement of the valve plate with respect to the main body, the sliding area including a communication groove located opposite of the seal ring when the valve plate is in the cleaning position and the communication groove defining a liquid flow pathway about the seal ring seal and fluidically communicating the actuation duct with the upstream duct.

11. The piston device according to claim 10, wherein the actuation chamber comprises a cleaning area having a diameter greater than the diameter of the actuation piston, the actuation piston being located in the cleaning area in the cleaning position of the valve plate such that liquid flowing in the actuation chamber is able to flow around the actuation piston.

12. The piston device according to claim 11, wherein the actuator comprises an additional piston placed in the cleaning area of the actuation chamber and being in fluid tight contact with a wall of the cleaning area, the additional piston being actuatable to move the actuation piston from the cleaning area to an active area where the actuation piston is in liquid tight contact with a wall of the actuation chamber to place the valve plate back in the opened position.

13. The piston device according claim 1, wherein the valve plate extends upright of the section of the inner chamber both in the opened position and in the closed position of the plate.

* * * * *